United States Patent
Aletti (10) Patent No.: US 8,082,883 B2
(45) Date of Patent: Dec. 27, 2011

(54) PET FOOD ELEVATING DEVICE

(76) Inventor: George Aletti, Burnaby (CA)

( * ) Notice: Subject to any disclaimer, the term of this patent is extended or adjusted under 35 U.S.C. 154(b) by 28 days.

(21) Appl. No.: 12/634,452

(22) Filed: Dec. 9, 2009

(65) Prior Publication Data

US 2010/0147224 A1    Jun. 17, 2010

(30) Foreign Application Priority Data

Dec. 11, 2008    (CA) ...................................... 2646215

(51) Int. Cl.
*A01K 5/01* (2006.01)
(52) U.S. Cl. .................................................. 119/61.57
(58) Field of Classification Search ............... 119/51.01, 119/51.14, 51.5, 52.1, 55, 57.92, 61.1, 61.2, 119/61.5, 61.56, 61.57; D30/127; 254/4 R, 254/4 B, 4 C, 134, DIG. 11, DIG. 14
See application file for complete search history.

(56) References Cited

U.S. PATENT DOCUMENTS

| | | | | |
|---|---|---|---|---|
| 989,744 | A | * | 4/1911 | Wilmot ........................ 254/387 |
| 1,698,355 | A | | 1/1929 | Wiemer |
| 3,661,121 | A | | 5/1972 | Zielin |
| 4,120,378 | A | | 10/1978 | Mills |
| 4,205,629 | A | | 6/1980 | Wix |
| 4,350,120 | A | * | 9/1982 | Bittle ......................... 119/51.13 |
| 4,976,223 | A | | 12/1990 | Pierce |
| 5,000,124 | A | | 3/1991 | Bergen |
| 5,054,431 | A | | 10/1991 | Coviello |
| 5,081,957 | A | | 1/1992 | Warner, Jr. |
| 5,421,290 | A | | 6/1995 | Welch |
| 5,501,176 | A | | 3/1996 | Tully |
| 5,584,263 | A | | 12/1996 | Sexton |
| 5,680,436 | A | | 10/1997 | Nyzen |
| 5,794,563 | A | | 8/1998 | Klepac |
| 5,797,504 | A | * | 8/1998 | Mangum ....................... 212/303 |
| 5,887,545 | A | | 3/1999 | Cuttress |
| 6,234,454 | B1 | | 5/2001 | Vassioukevitch |
| 6,311,640 | B1 | | 11/2001 | Mercado |
| 6,622,653 | B1 | | 9/2003 | Starnes, Jr. |
| 6,681,719 | B1 | | 1/2004 | Warner |
| 6,901,880 | B2 | | 6/2005 | Hammer |
| 7,318,391 | B2 | | 1/2008 | Brillon |

FOREIGN PATENT DOCUMENTS

| | | |
|---|---|---|
| GB | 367954 | 3/1932 |
| GB | 2198928 A | 6/1988 |
| GB | 2277014 A | 10/1994 |

* cited by examiner

*Primary Examiner* — Rob Swiatek
*Assistant Examiner* — Ebony Evans
(74) *Attorney, Agent, or Firm* — Oyen Wiggs Green & Mutala LLP (57) ABSTRACT

A pet food elevating device having a food platform and wheels coupled to the food platform with a vertical track positioned to slidably receive the wheels. A rope is movably engaged with an upper pulley positioned to allow the pet food elevating device to be raised to a desired elevation within the vertical track. A first end of the rope is coupled to the food platform, and a second end of the rope is available to a user of the pet food elevating device to raise or lower the food platform. The second end of the rope may be secured to hold the pet food elevating device at a desired elevation.

20 Claims, 6 Drawing Sheets

PET FOOD ELEVATING DEVICE

TECHNICAL FIELD

This invention relates to devices for elevating household items, and in particular to devices for raising and lowering pet food dishes.

BACKGROUND

As an individual ages, he or she may begin to lose mobility, and become less and less capable of performing routine household tasks including bending over to feed and water household pets. Other persons may be confined to a wheelchair. For those persons living alone, it may ultimately become necessary to give a household pet away when it is no longer possible for the person to safely bend over to clean the pet's feeding area, or to place food and water dishes on the floor for the animal. Giving up a pet may be devastating for an elderly individual, who may already be coping with the loss of aging friends and loved ones.

U.S. Pat. No. 5,054,431 Coviello discloses a food supporting platform for animal food, and a vertical guide mounted on a frame for supporting the platform at a plurality of heights for access to the platform by the animal for feeding and by an operator not capable of stopping to service the platform.

U.S. Pat. No. 5,584,263 Sexton discloses a pet food dish elevating assembly comprising: a main housing unit formed as a generally rectangular shaped box with an essentially hollow interior, a front face and opposing sidewalls, the interior including an electrically powered motor and two large buttons operatively coupled to the motor, the buttons extending through the front face, an axle being rotatably coupled within the side walls and including at least two axle sprockets, a motor sprocket extending from the motor and coupled to a first axle sprocket by a horizontal chain, activation of the motor causing the motor sprocket to rotate thereby rotating the axle of the apparatus; and at least one vertical leg coupled to the main housing unit, a vertical chain being positioned within a leg and around a second axle sprocket, a tray formed in a generally L-shaped configuration being coupled to the vertical chain, a user depressing a first button to move the tray upwardly, a user depressing a second button to move the tray downwardly.

U.S. Pat. No. 7,318,391 Brillon discloses a lifter for pet food or water bowls that consists of a channel through which slides a riser lifting a hook onto which is hooked either a platform or a bowl or any such container. A handle allows the user to raise the hook to any desired height at which point it is automatically locked to that given height. By actuating a lever, the hook can be lowered.

There remains a need for a pet food elevating device which is easy for persons with reduced mobility to operate, and which may be readily installed without providing an obtrusive structure.

SUMMARY

A pet food elevating device comprising a food platform, a wheel assembly having wheels coupled to the food platform, a vertical track for slidably receiving the wheels, an upper pulley, and a rope movably engaged with the pulley, a first end of the rope being coupled to the food platform, is provided. In some embodiments, the pet food elevating device may include a ring attached to a second end of the rope. The pet food elevating device may include a projection on the food platform, and the projection may be engageable with the ring to secure the pet food elevating device at a predetermined height. The upper pulley may be coupled to an upper portion of the vertical track.

In one exemplary embodiment, the pet food elevating device has a food platform with a vertical portion and a horizontal portion, and a securing projection extending approximately horizontally from a first side of the vertical portion. In this exemplary embodiment, the pet food elevating device also has a food cradle, being an oval-shaped element coupled to the horizontal portion of the food platform, the oval-shaped element being sized to support a rim of pet food dishes. The pet food elevating device also includes a wheel assembly coupled to a second side of the vertical portion of the food platform, the wheel assembly comprising two pairs of wheels. The pet food elevating device has a vertical track, and the two pairs of wheels are slidably engaged with the vertical track. A pulley is coupled to an upper end of the vertical track, and a rope is movably engaged with the pulley, a first end of the rope being coupled to the food platform, and a second end of the rope being coupled to a ring. The ring is engageable with the securing portion to secure the pet food elevating device is secured at a predetermined elevation.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Figure 1:
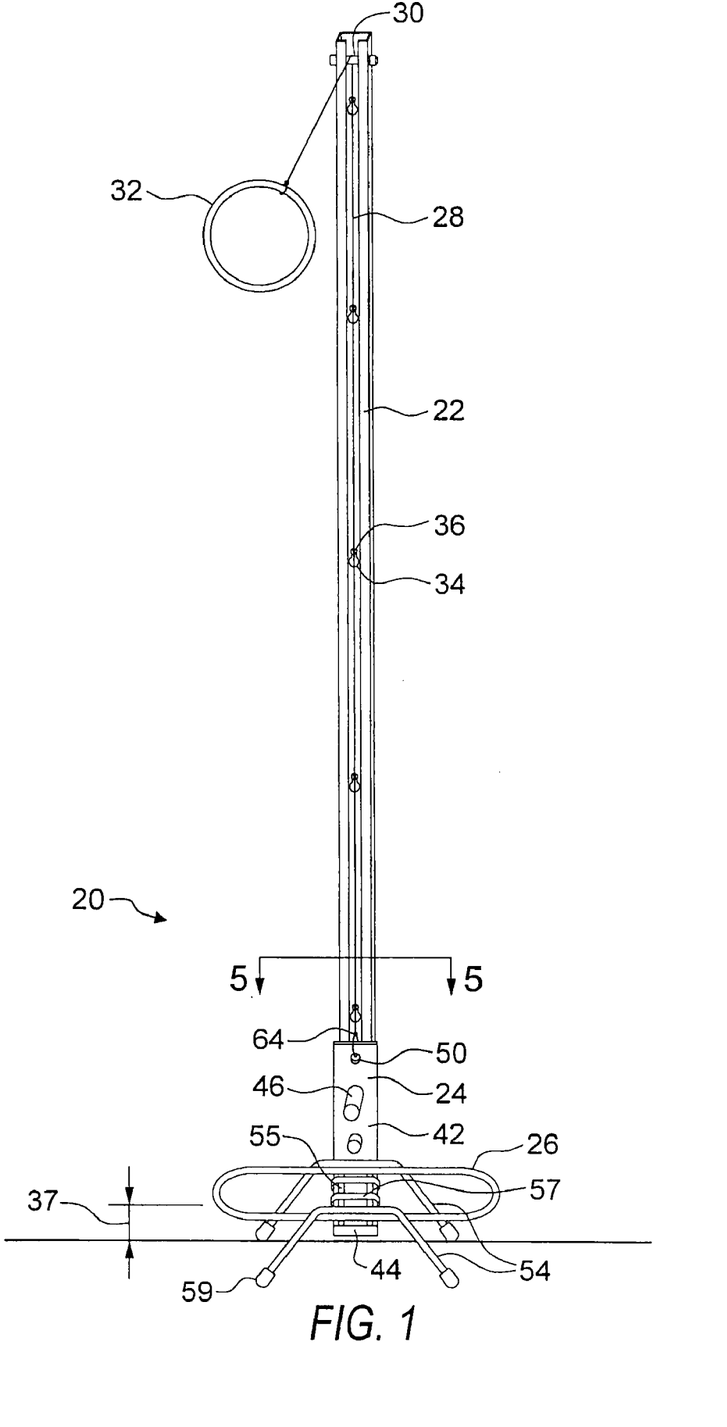
FIG. 1 is a front view of an embodiment of a pet food elevating device in a lowered configuration.
Figure 2:
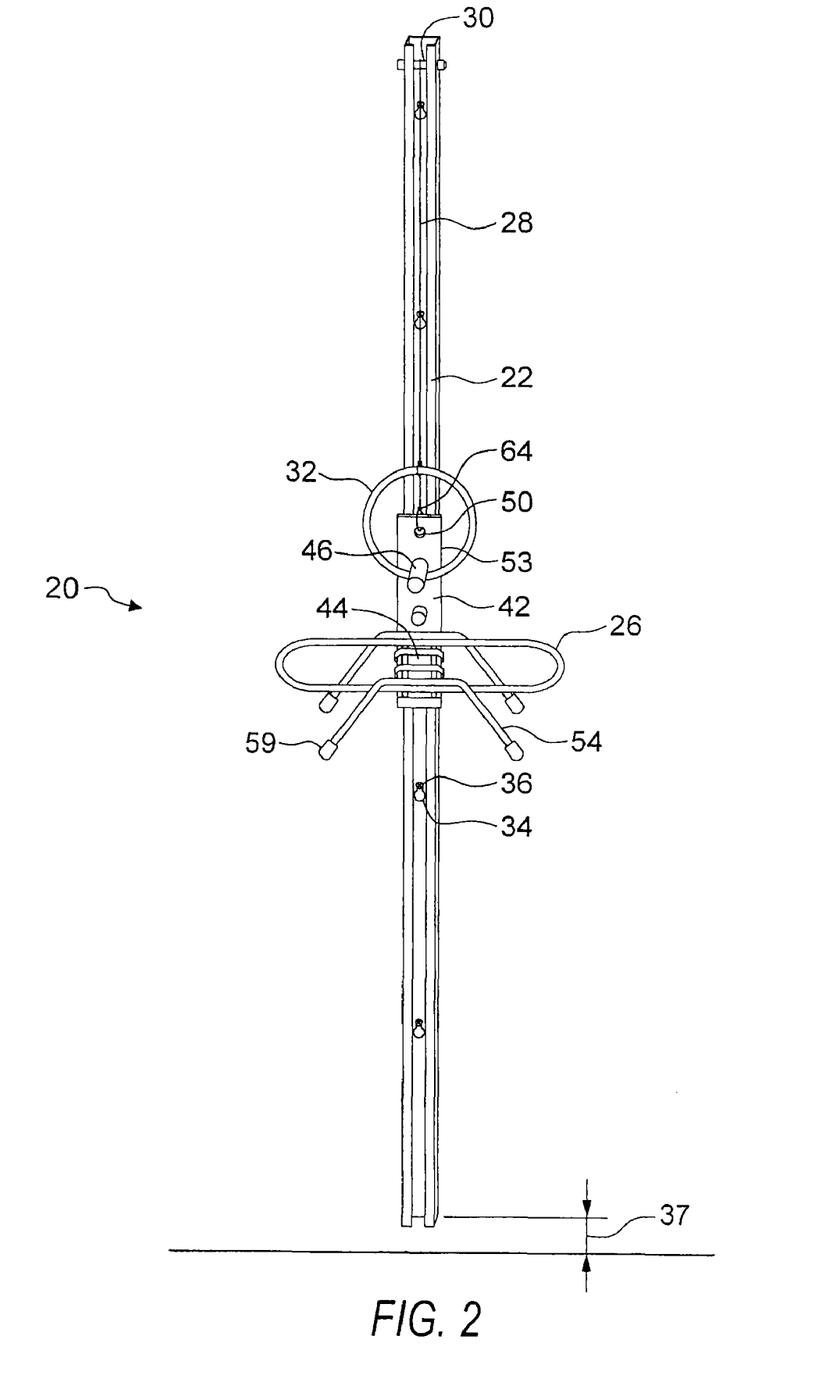
FIG. 2 is a front view of the FIG. 1 embodiment of a pet food elevating device fixed at a predetermined raised elevation.

With reference to FIGS. 1 and 2, the illustrated embodiment of a pet food elevating device 20 includes a vertical track 22, a food platform 24, an optional food cradle 26, a rope 28, an upper pulley 30, and a handle 32.

In use, the vertical track 22 may be affixed to a structure such as a wall, support beam, door, or other suitable supporting structure in an area where it is desired to feed a pet. In the illustrated embodiment, the vertical track 22 may include key hole hangers 34 to receive mounting screws 36 to secure the vertical track 22 in the desired location. Other mechanisms of securing the vertical track 22 in place, such as through the use of nails or other suitable securing members, or glue or other adhesives, may also be used. While the vertical track 22 is preferably installed in a vertical orientation, it will be apparent that the vertical track 22 could be disposed in other orientations, for example at an angle of several degrees away from the vertical, and still achieve the desired function of elevating pet food.

Conveniently, the vertical track 22 may be installed so that its base is just slightly above the ground, leaving a gap 37, to permit the area under the pet food elevating device to be easily cleaned. If the vertical track 22 is installed above the ground, it should be installed sufficiently close to the ground that wheels 38, described below, will not drop out of the vertical track 22 when the pet food elevating device 20 is in its fully lowered position.

The upper pulley 30 may be coupled to an upper end of the vertical track 22, as shown in the illustrated embodiment. Alternatively, the upper pulley 30 may be coupled to the wall at a suitable elevation using screws, nails, adhesives, or other suitable fasteners, for example, above or adjacent to the vertical track 22, so as to allow the pet food elevating device 20 to be raised and lowered to the desired height. The upper pulley 30 may be a conventional pulley, or may be made of a smooth piece of metal, wood, plastic, or other material which allows the rope 28 to move smoothly over the pulley 30.

Figure 3A:
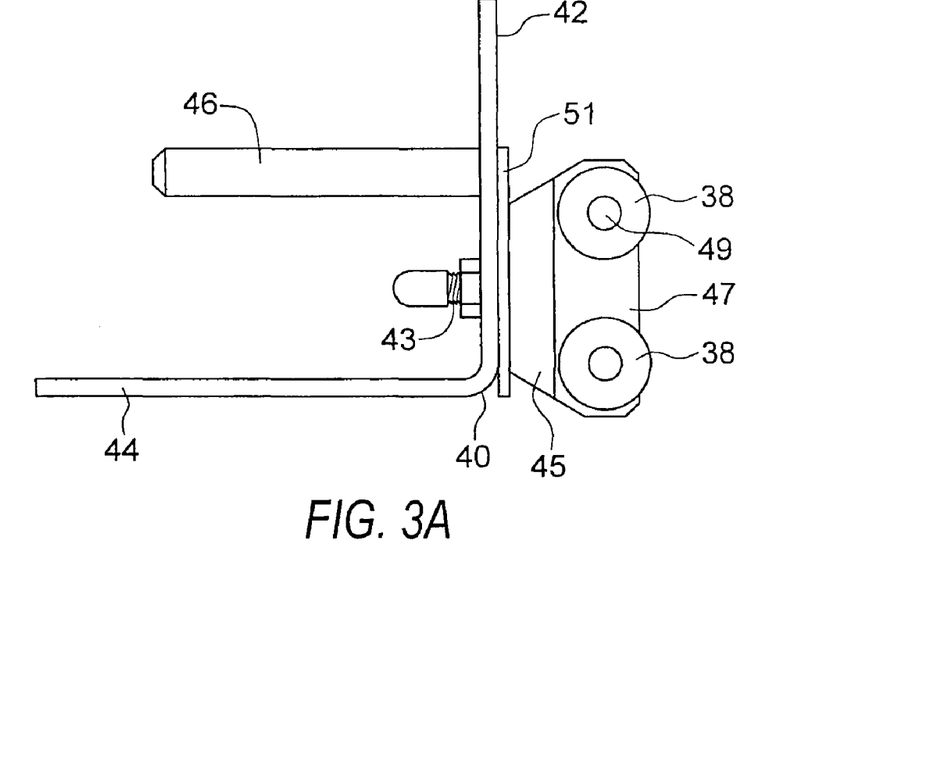
FIG. 3A is a side view of an embodiment of a food platform.

With particular reference to FIG. 3A, the illustrated embodiment of the food platform 24 includes a support plate 40. Support plate 40 includes a vertical portion 42 and a horizontal portion 44. However, other configurations of the food platform 24 are possible, so long as the food platform 24 supports both a wheel assembly 45 and pet food dishes 48. The wheel assembly 45, including the wheels 38, may be coupled to the vertical portion 42 of the support plate 40, for example by a bolt 43 as illustrated, or by using glue, welding, or other suitable attachment methods. The wheel assembly 45 may be a standard wheel assembly, such as those commonly used in the construction of closets or other sliding doors. In the embodiment illustrated in FIG. 3A, the wheel assembly 45 includes two longitudinally aligned pairs of wheels 38 coupled to a vertical plate 47 through axles 49. The vertical plate 47 is in turn coupled to a securing plate 51, which is attached to the vertical portion 42 of the support plate 40, for example by the bolt 43.

Figure 3B:
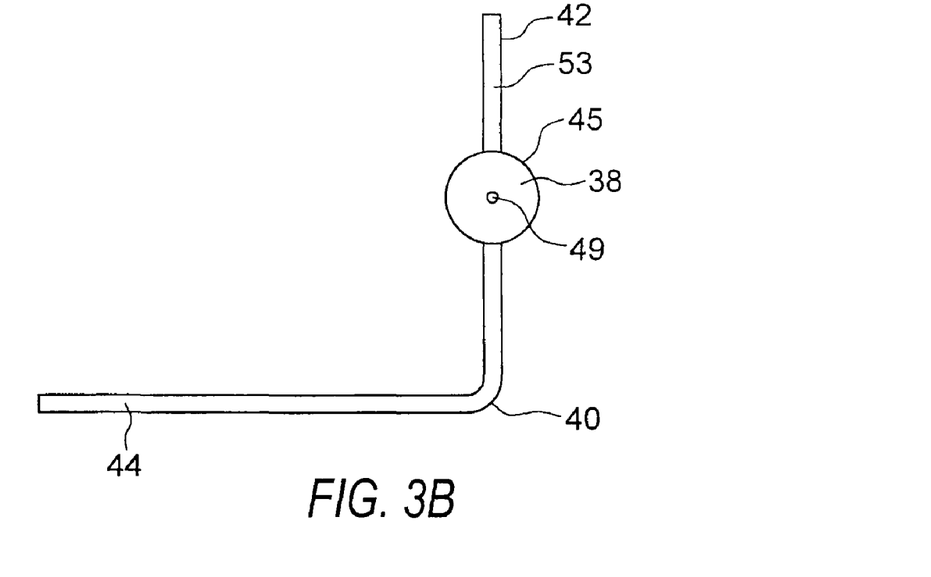
FIG. 3B is a side view of a second embodiment of a food platform.

Any suitable number and configuration of wheels 38 which allows the food platform 24 to travel within the vertical track 22 may be used for the wheel assembly 45. For example, the wheels 38 could be coupled directly to the sides 53 of the vertical portion 42 and the support plate 40 sized appropriately to permit the wheels 38 to slidingly engage with the vertical track 22. Alternatively, a single wheel 38 could be rotatably coupled directly on each side 53 of the vertical portion 42 of the support plate 40 and the support plate 40 sized appropriately to permit the wheels 38 to slidingly engage with the vertical track 22 to provide the wheel assembly 45, as illustrated in FIG. 3B.

The food platform 24 may further include a securing projection 46 on the support plate 40. In operation, the handle 32 may be fitted over the securing projection 46, thereby holding the pet food elevating device 20 at a predetermined elevation, which may conveniently be an elevation that allows a person to fill or change pet food dishes 48 secured in the food cradle 26 without having to bend over or crouch down towards the floor. In some embodiments, the handle 32 may be a ring made of metal or plastic, or a flexible material such as rope or rubber, or other suitable material. The handle 32 may be coloured. A large colourful ring is particularly advantageous to ensure ease of use of the pet food elevating device 20 by elderly persons, who may have reduced cognitive capacities as well as decreased mobility. Alternatively, other mechanisms may be used to support the pet food elevating device 20 at a predetermined height, such as a clip at the free end of the rope 28 or on the support plate 40. Additionally, a series of projecting pegs could be provided on the exterior of the vertical track 22, which would allow the pet food elevating device 20 to be secured at a plurality of predetermined elevations.

The support plate 40 may be provided with a hole 50, through which one end of the rope 28 may be inserted and secured. The rope 28 may be secured to the support plate 40 by tying a knot, or by other methods than via insertion through the hole 50, such as being secured by a suitable glue or adhesive, or by a clamp or other holding device secured to the support plate 40.

Figure 4:
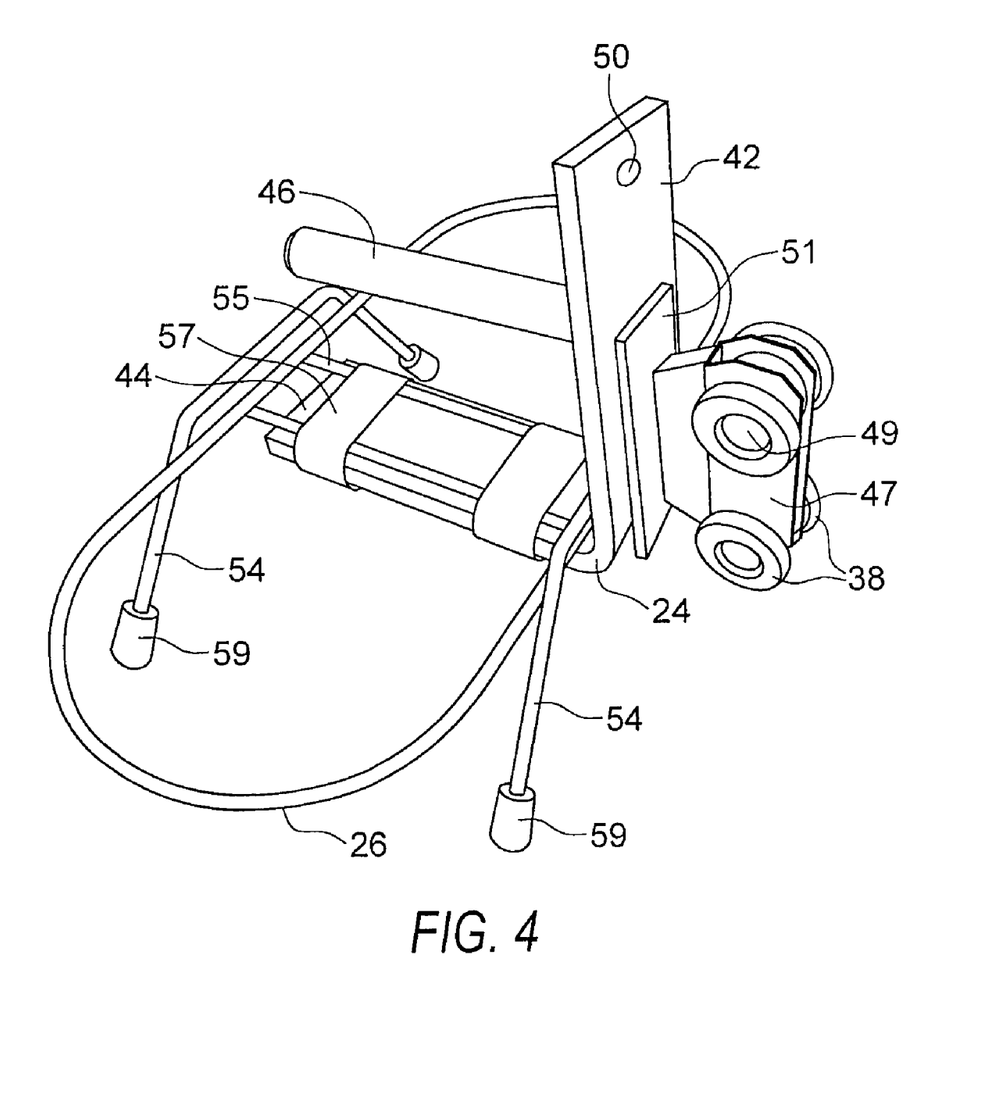
FIG. 4 is a perspective view of an embodiment of a food platform and a food cradle.

With reference to FIG. 4, the support plate 40 additionally provides a platform for securing the optional food cradle 26. The food cradle 26 functions to support the pet food dishes 48, although it will be apparent that the construction of the food platform 24 may be so as to achieve this function, or alternatively that the food platform 24 could be integrally formed with the illustrated food cradle 26. In some embodiments, the food cradle 26 may be easily removable from the food platform 24, so that it may be separately used to support the pet food dishes 48 apart from the pet food elevating device 20.

In the illustrated embodiment, the food cradle 26 is an oval-shaped element that is secured to the horizontal portion 44 of the support plate 40 by optional cross bars 55 extending parallel to the horizontal portion 44 of the support plate 40 across the central portion of the food cradle 26. Preferably, the optional food cradle 26 is made from plastic coated wire or formed from plastic, for ease of cleaning. The cross bars 55 may be secured to the horizontal portion 44 of the support plate 40 by tape 57, or alternatively by clamps, clips, elastics, rope or other securing elements. In the illustrated embodiment, the food cradle 26 supports a rim 52 of the pet food dishes 48 when the pet food dishes 48 are placed on the food cradle 26. However, the food cradle 26 could be shaped and designed to accommodate pet food dishes of any shape or size. For example, the two halves of the food cradle 26 (or, alternatively, the food platform 24) could further include baskets or additional cross bars 55 to support pet food dishes without rims. Alternatively, the food cradle 26 or a portion of the food platform 24 could be formed as a horizontal platform, to support a base of the pet food dishes 48.

The food cradle 26 or the food platform 24 may optionally include legs 54, to support the pet food dishes 48 just slightly above the ground when the pet food elevating device 20 is in a fully lowered position. The legs 54 help to ensure that the pet food dishes 48 are not dislodged from the food cradle 26 when the pet food device 20 is lowered. In the illustrated embodiment, the legs 54 are formed from single pieces of wire or plastic which may be bent to or formed in the desired shape and secured to the outer edges of the food cradle 26 with glue or other suitable adhesives. The legs 54 may optionally include rubber stops 59 at the free ends of the legs 54, to ensure that the legs 54 rest securely on the floor, and do not scratch any surface finishing on the floor. The legs 54 could alternatively be secured to the support plate 40, or other portions of the food platform 24.

Figure 5:
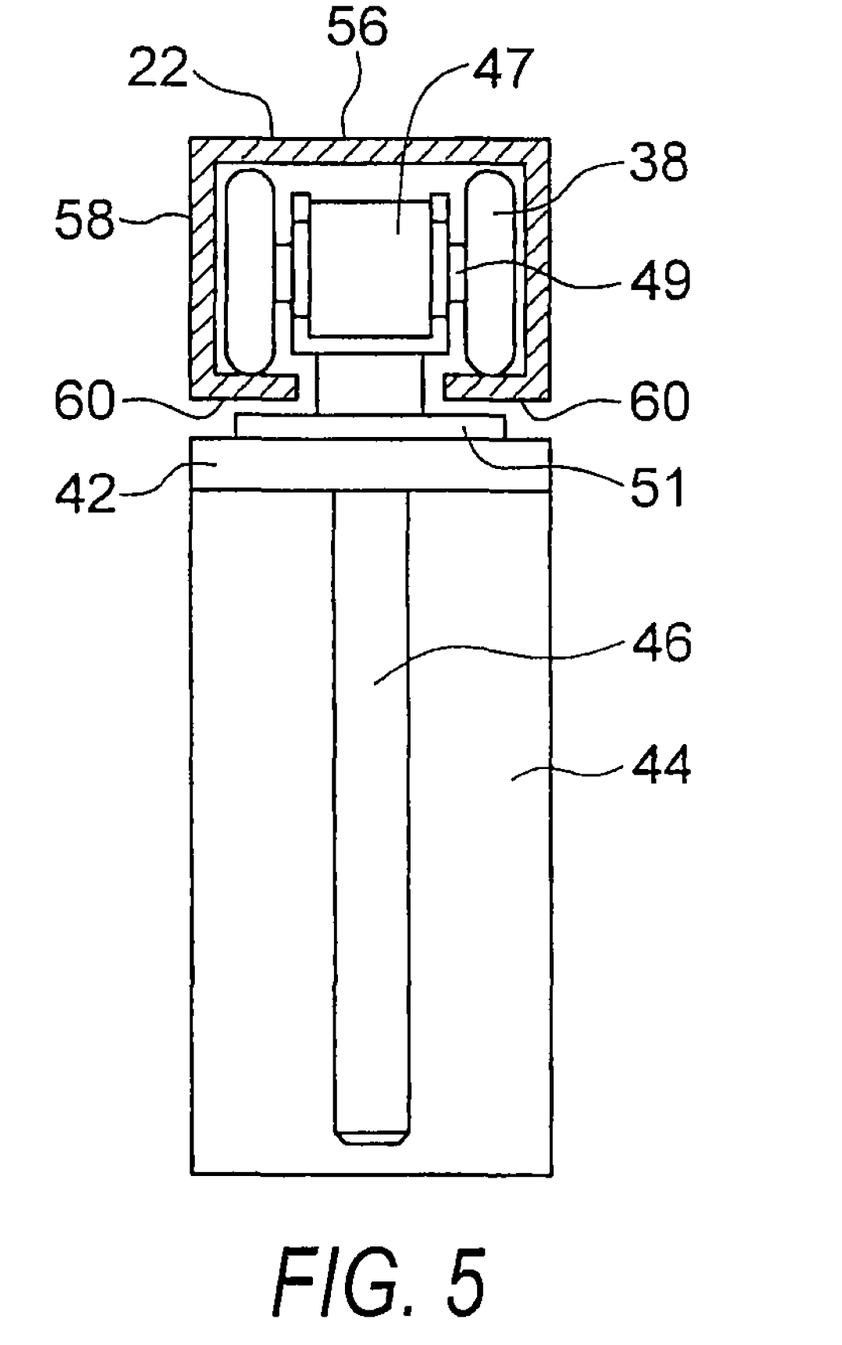
FIG. 5 is a close-up cross-sectional view of portions of the FIG. 1 embodiment taken along line 5-5. Selected components of the pet food elevating device have been omitted to more clearly show the construction of the FIG. 1 embodiment.

With reference to FIG. 5, the wheels 38 are positioned so as to slidably engage with (i.e. run vertically in) the vertical track 22. In the illustrated embodiment, the vertical track 22 includes a rear surface 56, two side surfaces 58, and two front rail portions 60 that project inwardly from the side surfaces 58. The wheels 38 are slidably engaged between rear surface 56 and respective front rail portions 60, thereby ensuring that the food platform 24 is securely retained in the vertical track 22 while permitting smooth upward and downward movement of the food platform 24. The smooth upward and downward motion achieved by the use of the wheels 38 sliding in the vertical track 22 in response to the force applied by the rope 28 running through the pulley 30 contributes to the ease of use of the pet food elevating device 20 for persons with impaired mobility.

In operation, the wheels 38 are inserted within the vertical track 22, which has been secured at the desired location as described above. A first end 64 of the rope 28 is secured to the food platform 24, and the free end of the rope 28 is passed over the upper pulley 30. The handle 32 is then attached to the free end of the rope 28, for example by tying a knot around the handle 32. The pet food elevating device 20 may then be easily moved upwardly by a user pulling on the handle 32, and downwardly by a user releasing the handle 32. To secure the pet food elevating device 20 at a predetermined elevation, the handle 32 may be passed over the securing projection 46, thereby holding the pet food elevating device 20 at a comfortable elevation for filling or changing the pet food dishes 48, or to permit the area below the pet food elevating device 20 to be easily cleaned. Preferably, the length of the rope 28 and the position of the handle 32 are such as to ensure that the pet food elevating device 20 is secured at a height so that a user of the pet food elevating device 20 does not have to bend over or stoop to place food or water on the pet food elevating device 20, or to change the pet food dishes 48 on the food cradle 26. For example, a suitable length for the rope 28 may be 7 feet. The rope 28 may be made of nylon, or may be a piece of string or other material that can slide easily through the pulley 30, and which is strong enough to support the pet food dishes 48 when these are full.

Figure 6:
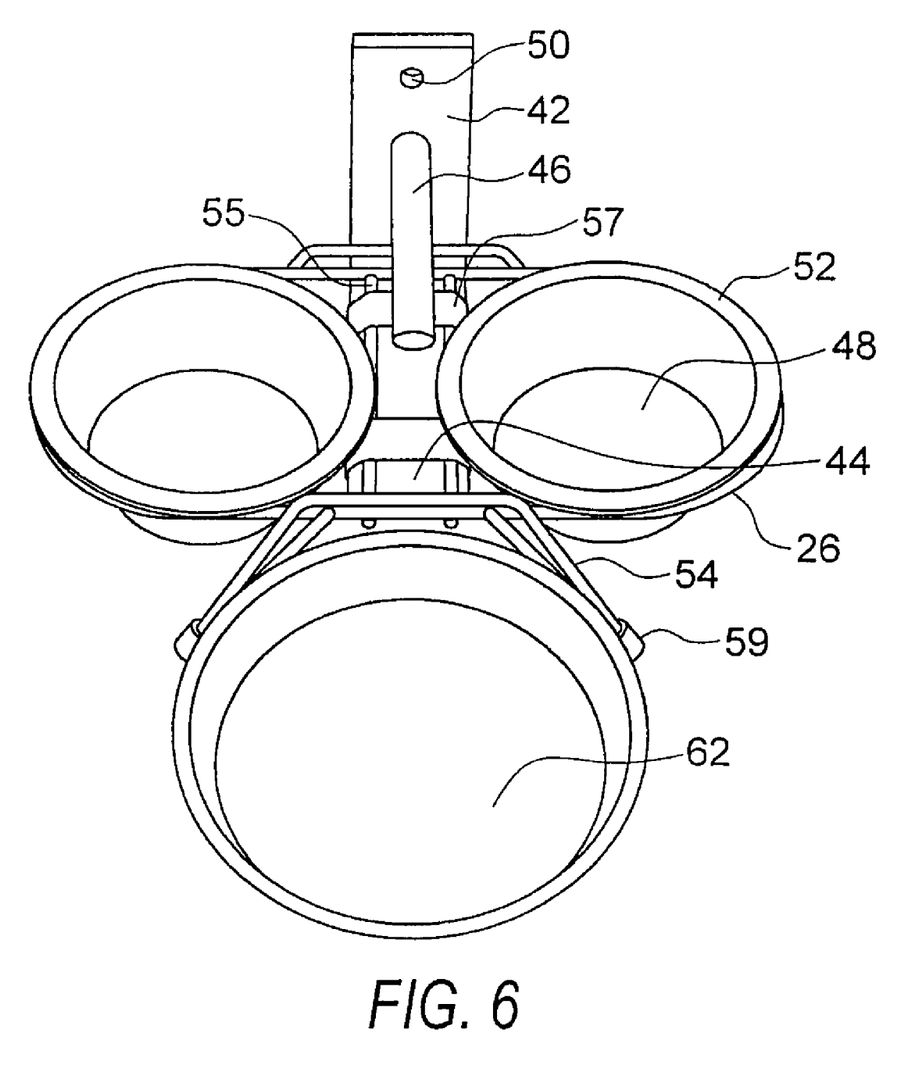
FIG. 6 is a perspective view of an embodiment of a food cradle with pet food dishes in the food cradle and a feed tray coupled to the food cradle.

With reference to FIG. 6, a further embodiment of a food cradle 26, including an optional feed tray 62 coupled to the food cradle 26, is shown. The optional feed tray 62 may be of any desired shape or size, and may be conveniently secured to the pet food elevating device 20 at the legs 54, using a suitable adhesive or securing member. The optional feed tray 62 may alternatively be secured to the food cradle 26 or the food platform 24, using, for example, a suitable securing member such as a clip, clamp, elastics, rope, or a suitable adhesive.

While a number of exemplary aspects and embodiments have been discussed above, those of skill in the art will recognize certain modifications may be made within the scope of the invention. For example, the food cradle 26 could be replaced by a level platform secured to the horizontal portion 44 of the support plate 40 of the food platform 24;

the horizontal portion 44 of the support plate 40 could be omitted, and the pet food cradle 26 securely coupled directly to the vertical portion 42 of the support plate 40;

one or more of the pet food dishes 48 could be integrally formed with the food cradle 26 or the food platform 24; or a pair of vertical tracks 22 could be used, with one set of wheels 38 on one wheel assembly 45 movably engaged in each of the tracks.

It is therefore intended that the following appended claims and claims hereafter introduced are interpreted to include all such modifications as are within their true scope.

What is claimed is:

1. A pet food elevating device comprising:
   (a) a food platform;
   (b) a wheel assembly having wheels coupled to the food platform;
   (c) a vertical track for slidably receiving the wheels;
   (d) an upper pulley;
   (e) a rope movably engaged with the upper pulley, a first end of the rope being coupled to the food platform; and
   (f) a food cradle coupled to the food platform.

2. A pet food elevating device according to claim 1, wherein the food cradle is sized to support rims of a pet food dish.

3. A pet food elevating device according to claim 1, wherein the food cradle comprises an oval-shaped element.

4. A pet food elevating device according to claim 1, wherein the food cradle is removable.

5. A pet food elevating device according to claim 1, further comprising a feed tray coupled to the food cradle.

6. A pet food elevating device according to claim 1, further comprising legs.

7. A pet food elevating device according to claim 1, further comprising a removable pet food dish.

8. A pet food elevating device according to claim 1, wherein the wheel assembly comprises two pairs of wheels.

9. A pet food elevating device according to claim 1, wherein the wheel assembly comprises a pair of single wheels, each one of the wheels being coupled to an opposite side of the food platform.

10. A pet food elevating device according to claim 1, wherein the vertical track comprises a rear surface, two side surfaces, and two front rail portions projecting inwardly from the side surfaces.

11. A pet food elevating device according to claim 10, wherein each one of the wheels is slidably engaged between the rear surface of the vertical track and one of the front rail portions of the vertical track.

12. A pet food elevating device according to claim 1, wherein the upper pulley comprises a smooth piece of metal, wood or plastic.

13. A pet food elevating device according to claim 1, wherein the upper pulley is coupled to an upper end of the vertical track.

14. A pet food elevating device according to claim 1, further comprising a projection on the food platform for securing the pet food elevating device at a predetermined height.

15. A pet food elevating device according to claim 14, further comprising a ring attached to a second end of the rope, the ring being engageable with the projection.

16. A pet food elevating device according to claim 1, wherein the food platform comprises a horizontal platform.

17. A pet food elevating device comprising:
    (a) a food platform;
    (b) a wheel assembly having wheels coupled to the food platform;
    (c) a vertical track for slidably receiving the wheels;
    (d) an upper pulley; and
    (e) a rope movably engaged with the upper pulley, a first end of the rope being coupled to the food platform,
    wherein at least one pet food dish is integrally formed with the food platform.

18. A pet food elevating device comprising:
    (a) a food platform having a vertical portion and a horizontal portion, a securing projection extending approximately horizontally from a first side of the vertical portion;
    (b) a food cradle comprising an oval-shaped element coupled to the horizontal portion of the food platform, the oval-shaped element being sized to support a rim of pet food dishes;

(c) a wheel assembly coupled to a second side of the vertical portion of the food platform, the wheel assembly comprising two pairs of wheels;
(d) a vertical track, the two pairs of wheels being slidably engaged with the vertical track;
(e) a pulley coupled to an upper end of the vertical track;
(f) a rope movably engaged with the pulley, a first end of the rope being coupled to the food platform; and
(g) a ring coupled to a second end of the rope, the ring being engageable with the securing projection to secure the pet food elevating device at a predetermined elevation.

19. A pet food elevating device according to claim 18, wherein the ring is brightly coloured.

20. A pet food elevating device according to claim 18, further comprising legs.

* * * * *